US012070874B2

(12) United States Patent
Naito

(10) Patent No.: US 12,070,874 B2
(45) Date of Patent: Aug. 27, 2024

(54) HONEYCOMB STRUCTURE AND METHOD FOR PRODUCING SAME

(71) Applicant: NGK Insulators, Ltd., Nagoya (JP)

(72) Inventor: Yuto Naito, Kasugai (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/146,593

(22) Filed: Dec. 27, 2022

(65) Prior Publication Data

US 2023/0286190 A1    Sep. 14, 2023

(30) Foreign Application Priority Data

Mar. 11, 2022  (JP) ................................ 2022-038474

(51) Int. Cl.
*F01N 3/022*     (2006.01)
*B28B 11/00*     (2006.01)
*F01N 3/027*     (2006.01)

(52) U.S. Cl.
CPC .......... *B28B 11/007* (2013.01); *F01N 3/0222* (2013.01); *F01N 3/027* (2013.01); *F01N 2330/06* (2013.01)

(58) Field of Classification Search
None
See application file for complete search history.

(56) References Cited

U.S. PATENT DOCUMENTS

| 2014/0291315 | A1* | 10/2014 | Mase | ........................ F01N 3/24 219/553 |
| 2015/0030510 | A1* | 1/2015 | Mase | .................... F01N 3/2026 422/180 |
| 2015/0260066 | A1 | 9/2015 | Hosoi et al. | |
| 2016/0215667 | A1* | 7/2016 | Omiya | .................. F01N 3/2828 |

FOREIGN PATENT DOCUMENTS

JP        2015-174011 A      10/2015

* cited by examiner

*Primary Examiner* — Elizabeth Collister
(74) *Attorney, Agent, or Firm* — BURR PATENT LAW, PLLC

(57) ABSTRACT

A honeycomb structure comprising an outer peripheral wall; a partition wall defining a plurality of cells each extending from one end face to other end face, a plurality of slits extending radially inward from an outer peripheral surface of the honeycomb structure and extending in an extending direction of the cells; and a filling material filled in the slits. A difference between a width Y of the filling material when viewed from the outside in the radial direction of the honeycomb structure, and a width X of each of the slits on the outer peripheral surface of the honeycomb structure, represented by (Y−X), is determined for each of the slits, and a difference between a maximum value A of the difference and a minimum value B of the difference, represented by the (A−B), is 0.4 mm or less.

6 Claims, 4 Drawing Sheets

HONEYCOMB STRUCTURE AND METHOD FOR PRODUCING SAME

FIELD OF THE INVENTION

The present invention relates to a honeycomb structure and a method for producing the same.

BACKGROUND OF THE INVENTION

In general, electrically heating catalysts (EHCs) are known. The EHCs are for purifying an exhaust gas emitted when an engine (internal combustion engine) is in a cold state immediately after the engine is started, by arranging electrodes on a honeycomb structure made of conductive ceramics, and heating the honeycomb structure itself by energization to increase a temperature of a catalyst supported on the honeycomb structure to an activation temperature before starting the engine.

Patent Literature 1 as described below discloses a honeycomb structure in which one or more slits opening on side surfaces are formed in a honeycomb structure portion to improve thermal shock resistance of the honeycomb structure. Further, it proposes that at least one of the slits is filled with a filling material to prevent a gas passing through the honeycomb structure from leaking out from the above slits to the outer peripheral side of the honeycomb structure while maintaining the thermal shock resistance. Patent Literature 1 discloses a method of filling the slit with the filling material using a syringe or a spatula.

CITATION LIST

Patent Literature

[Patent Literature 1] Japanese Patent Application Publication No. 2015-174011 A

SUMMARY OF THE INVENTION

In general, when filling the slits with the filling material, the slits are filled with the filling after masking the outer peripheral surface of the honeycomb structure portion in which the slits are formed. At this time, masking is performed so as to exclude the slits to be filled with the filling material. That is, portions (masked slits) where any mask is not applied are formed so as to correspond to the slits on the outer peripheral surface of the honeycomb structure portion.

As a result of intensive studies, the present inventors have found that a width of the filling material varies depending on the masking method, which may cause a variation in stress relaxation performance in the circumferential direction of the honeycomb structure, and cause a risk of cracking in the honeycomb structure when the honeycomb structure is heated.

The present invention has been made to solve the above problems. An object of the present invention is to provide a honeycomb structure and a method for producing the same, which can reduce the risk of cracking in the honeycomb structure when the honeycomb structure is heated.

In an embodiment, a honeycomb structure according to the present invention comprises a honeycomb structure portion comprising: an outer peripheral wall; a partition wall arranged on an inner side of the outer peripheral wall, the partition wall defining a plurality of cells each extending from one end face to other end face to form a flow path, wherein the honeycomb structure further comprises: a plurality of slits extending radially inward from an outer peripheral surface of the honeycomb structure and extending in an extending direction of the cells; and a filling material filled in the slits, and wherein, when a difference between a width Y of the filling material and a width X of each of the slits, represented by the following equation (1), is determined for each of the slits, a difference between a maximum value A of the difference and a minimum value B of the difference, represented by the following equation (2), is 0.4 mm or less:

$$(Y-X) \qquad (1)$$

$$(A-B) \qquad (2),$$

in which equation (1), X represents the width of each of the slits on the outer peripheral surface of the honeycomb structure, and Y represents the width of the filling material when the filling material is viewed from the outside in the radial direction of the honeycomb structure.

The method for producing a honeycomb structure according to the present invention comprises: a masking step of applying a mask to an outer peripheral surface of a honeycomb structure base body, the honeycomb structure base body comprising a honeycomb structure portion comprising: an outer peripheral wall; a partition wall arranged on an inner side of the outer peripheral wall, the partition wall defining a plurality of cells each extending from one end face to other end face to form a flow path; after the masking step, a slit forming step of processing the honeycomb structure base body from the outside in a radial direction to form a plurality of slits extending radially inward from the outer peripheral surface of the honeycomb structure base body and extending in an extending direction of the cells; after the slit forming step, a filling step of filling the slits with a filling material; and after filling the slits with the filling material, a removing step of removing the mask.

According to an embodiment of the honeycomb structure and the method for producing the same according to the present invention, it is possible to reduce the risk of cracking in the honeycomb structure when it is heated.

DETAILED DESCRIPTION OF THE INVENTION

Hereinafter, embodiments for carrying out the present invention will be described with reference to the drawings. The present invention is not limited to each embodiment, and components can be modified and embodied without departing from the spirit of the present invention. Further, various inventions can be formed by appropriately combining a plurality of components disclosed in each embodiment. For example, some components may be removed from all of the components shown in the embodiments. Furthermore, the components of different embodiments may be optionally combined.

Figure 1:
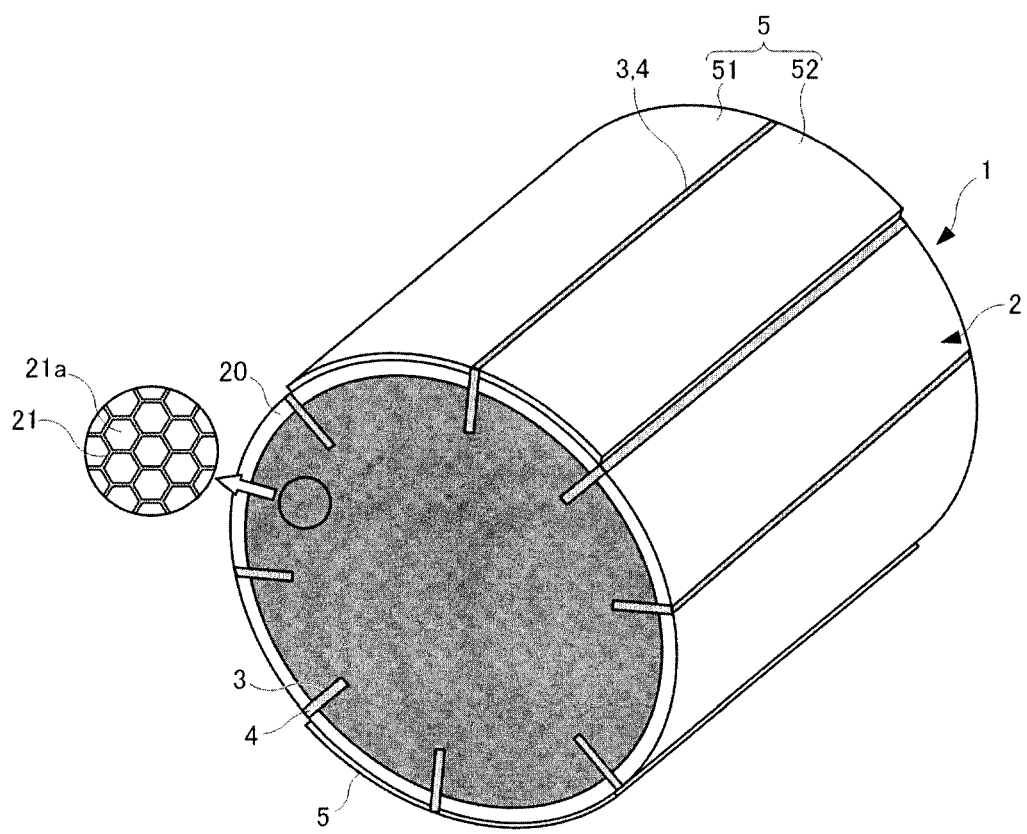
FIG. 1 is a perspective view showing a honeycomb structure according to an embodiment of the present invention.

FIG. 1 is a perspective view showing a honeycomb structure 1 according to an embodiment of the present invention. The honeycomb structure 1 shown in FIG. 1 includes: a honeycomb structure portion 2; a plurality of slits 3; a filling material 4; and a pair of electrode layers 5.

The honeycomb structure portion 2 is a pillar shaped member made of ceramics, and includes: an outer peripheral wall 20; and a partition wall 21 which is arranged on an inner side of the peripheral wall 20 and defines a plurality of cells 21a each extending from one end face to other end face to form a flow path.

An outer shape of the honeycomb structure 2 is not particularly limited as long as it has a pillar shape. For example, it can be a pillar shape having circular end faces (cylindrical shape), a pillar shape having oval end faces, and other shapes such as a pillar shape having polygonal (rectangular, pentagonal, hexagonal, heptagonal, octagonal, etc.) end faces. The pillar shape is understandable as a three-dimensional shape having a thickness in an extending direction of the cells 21a (axial direction of the honeycomb structure 1). A ratio of an axial length of the honeycomb structure portion 2 to a diameter or width of the end face of the honeycomb structure portion 2 (aspect ratio) is arbitrary. The pillar shape may also include a shape in which the axial length of the honeycomb structure portion 2 is shorter than the diameter or width of the end face (flat shape).

As for the size of the honeycomb structure portion 2, an area of the end faces is preferably from 2,000 to 20,000 mm$^2$, and even more preferably from 5,000 to 15,000 mm$^2$, in order to increase heat resistance (to suppress cracks generated in the circumferential direction of the outer peripheral wall 20).

A shape of each cell 21a in the cross section perpendicular to the extending direction of the cells 21a may preferably be a quadrangle, hexagon, octagon, or a combination thereof. Among these, the quadrangle and the hexagon are preferred. Such a cell shape can lead to a decreased pressure loss when an exhaust gas flows through the honeycomb structure 1, which can provide improved purification performance.

The partition wall 21 that defines the cells 21a preferably has a thickness of from 0.07 to 0.3 mm, and more preferably from 0.1 to 0.2 mm. The thickness of 0.1 mm or more of the partition wall 21 can suppress a decrease in the strength of the honeycomb structure 1. The thickness of the partition wall 21 of 0.3 mm or less can suppress a larger pressure loss when an exhaust gas flows through the honeycomb structure 1 if the honeycomb structure 1 is used as a catalyst support to support a catalyst. In the present invention, the thickness of the partition wall 21 is defined as a length of a portion passing through the partition wall 21, among line segments connecting the centers of gravity of adjacent cells 21a, in the cross section perpendicular to the extending direction of the cells 21a.

The honeycomb structure portion 2 preferably has a cell density of from 40 to 150 cells/cm$^2$, and more preferably from 70 to 100 cells/cm$^2$, in the cross section perpendicular to the extending direction of the cells 21a. The cell density in such a range can allow the purification performance of the catalyst to be increased while reducing the pressure loss when the exhaust gas flows. The cell density of 40 cells/cm$^2$ or more can allow a catalyst supported area to be sufficiently ensured. The cell density of 150 cells/cm$^2$ or less can prevent the pressure loss when the exhaust gas flows through the honeycomb structure portion 2 from being increased if the honeycomb structure portion 2 is used as a catalyst support to support the catalyst. The cell density is a value obtained by dividing the number of cells by the area of one end face portion of the honeycomb structure portion 2 excluding the outer peripheral wall 20 portion.

The provision of the outer peripheral wall 20 of the honeycomb structure portion 2 is useful from the viewpoints of ensuring the structural strength of the honeycomb structure portion 2 and suppressing the leakage of a fluid flowing through the cells 21a from the outer peripheral wall 20. Specifically, the thickness of the outer peripheral wall 20 is preferably 0.05 mm or more, and more preferably 0.10 mm or more, and even more preferably 0.15 mm or more. However, if the outer peripheral wall 20 is too thick, the strength will be too high, and a strength balance between the outer peripheral wall 20 and the partition wall 21 will be lost, resulting in a decrease in thermal shock resistance. Therefore, the thickness of the outer peripheral wall 20 is preferably 1.0 mm or less, and more preferably 0.7 mm or less, and even more preferably 0.5 mm or less. The thickness of the outer peripheral wall 20 is defined as a thickness of the outer peripheral wall in the normal line direction relative to the tangent line at a measured point when the point of the outer peripheral wall 20 where the thickness is to be measured is observed in the cross section perpendicular to the extending direction of the cells 21a.

The honeycomb structure portion 2 is made of ceramics and is preferably electrically conductive. Volume resistivity is not particularly limited as long as the honeycomb structure portion 2 is capable of heat generation by Joule heat when a current is applied. Preferably, the volume resistivity is from 0.1 to 200 Ωcm, and more preferably from 1 to 200 Ωcm. As used herein, the volume resistivity of the honeycomb structure portion 2 refers to a value measured at 25° C. by the four-terminal method.

The honeycomb structure portion 2 can be made of a material selected from the group consisting of oxide ceramics such as alumina, mullite, zirconia and cordierite, and non-oxide ceramics such as silicon carbide, silicon nitride and aluminum nitride, although not limited thereto. Further, silicon carbide-metal-silicon composite materials and silicon carbide/graphite composite materials can also be used. Among these, it is preferable that the material of the honeycomb structure portion 2 contains ceramics mainly based on a silicon-silicon carbide composite material or silicon carbide, in terms of balancing heat resistance and electrical conductivity. The phrase "the material of the honeycomb structure portion 2 is mainly based on silicon-silicon carbide composite material" means that the honeycomb structure portion 2 contains 90% by mass of more of silicon-silicon carbide composite material (total mass) based on the total material. Here, the silicon-silicon carbide composite material contains silicon carbide particles as an aggregate and silicon as a binding material to bind the silicon carbide particles, preferably in which a plurality of silicon carbide particles are bound by silicon such that pores are formed between the silicon carbide particles. The phrase "the material of the honeycomb structure portion 2 is mainly based on silicon carbide" means that the honeycomb structure portion 2 contains 90% or more of silicon carbide (total mass) based on the total material.

When the honeycomb structure portion 2 contains the silicon-silicon carbide composite material, a ratio of the "mass of silicon as a binding material" contained in the honeycomb structure portion 2 to the total of the "mass of silicon carbide particles as an aggregate" contained in the honeycomb structure portion 2 and the "mass of silicon as a binding material" contained in the honeycomb structure portion 2 is preferably from 10 to 40% by mass, and more preferably from 15 to 35% by mass.

The partition wall 21 may be porous. When the partition wall 21 is porous, the porosity of the partition wall 21 is preferably from 35 to 60%, and even more preferably from 35 to 45%. The porosity is a value measured by a mercury porosimeter.

The partition wall 21 of the honeycomb structure portion 2 preferably has an average pore diameter of from 2 to 15 μm, and even more preferably from 4 to 8 μm. The average pore diameter is a value measured by a mercury porosimeter.

The slits 3 extend radially inward from the outer peripheral surface of the honeycomb structure 1 and extend in the extending direction of the cells 21a. The slits 3 extend from one end face of the honeycomb structure portion 2 to the other end face in the extending direction of the cells 21a. Each of the slits 3 preferably has a depth of 60% or less, more preferably 0.5% or more and 25% or less, of the radius of the honeycomb structure portion 2 in the cross section perpendicular to the extending direction of the cells 21a. The width of each slit 3 may be 0.2 mm or more and 2.0 mm or less, and more preferably 0.2 mm or more and 1.0 mm or less. The depth of each slit 3 may be understood as a distance from the outer peripheral surface of the outer peripheral wall 20 to the tip of each slit 3.

In addition, the outer peripheral surface of the outer peripheral wall 20 forms at least a part of the outer peripheral surface of the honeycomb structure 1. More particularly, at a position where the outer peripheral surface of the outer peripheral wall 20 is exposed, that is, at a position where the outer peripheral surface of the outer peripheral wall 20 is not covered with the electrode layers 5, the outer peripheral surface of the outer peripheral wall 20 forms the outer peripheral surface of the honeycomb structure 1. On the other hand, at the positions where the pair of electrode layers 5 are provided, the outer peripheral surfaces of the pair of electrode layers 5 form the outer peripheral surface of the honeycomb structure 1. From another point of view, when observing the appearance of the honeycomb structure 1, the surface on which the plurality of slits 3 appear may be the outer peripheral surface of the honeycomb structure 1. It may be understood that the outer peripheral surface of the honeycomb structure 1 does not include the end face of the honeycomb structure portion 2 where the cells 21a are open.

The filling material 4 fills in the slits 3. At least part of a space of each slit 3 is preferably filled with the filling material 4. The filling material 4 preferably fills 50% or more of the space of each slit 3, and more preferably fills the entire space of each slit 3. In the embodiment as shown in FIG. 1, the filling material 4 fills the entire space of the slits 3, forms planes integral with both end faces of the honeycomb structure portion 2, and forms a curved surface integral with the outer peripheral surface of the honeycomb structure 1. However, the filling material 4 may be filled up to a position axially inner than the end face of the honeycomb structure portion 2, or may be filled up to a position radially inner than the outer peripheral surface of the honeycomb structure 1.

When the main component of the honeycomb structure portion 2 is silicon carbide or a metal silicon-silicon carbide composite material, the filling material 14 preferably contains at least 20% by mass silicon carbide, and more preferable from 20 to 70% by mass of silicon carbide. This can allow a thermal expansion coefficient of the filling material 14 to be close to that of the honeycomb structure portion 2, thereby improving the thermal shock resistance of the honeycomb structure portion 2. The filling material 14 may contain 30% by mass or more of silica, alumina, or the like.

The pair of electrode layers 5 are provided so as to extend in a form of a band in the extending direction of the cells 21a on the outer surface of the outer peripheral wall 20 across a central axis of the honeycomb structure portion 2. Although not shown, electrode terminals may be provided on the electrode layers 5. A voltage can be applied to the honeycomb structure portion 2 through those electrode terminals and electrode layers 5 to cause heat generation of the honeycomb structure portion 2.

Each of the pair of electrode layers 5 has first and second partial electrode layers 51, 52 separated by each slit 3. That is, at the positions where the electrode layers 5 are provided, each slit 3 extends radially inward from each electrode layer 5 and opens on the outer peripheral surface of each electrode layer 5. Each slit 3 may be filled with the filling material 4 between the first and second partial electrode layers 51, 52 as well.

The volume resistivity of the electrode layers 5 is preferably 1/200 or more and 1/10 or less of the electric resistivity of the honeycomb structure portion 2, in terms of facilitating the flow of electricity to the electrode layers 5.

Each electrode layer 5 may be made of conductive ceramics, a metal, or a composite material (cermet) of a metal and a conductive ceramic. Examples of the metal include a single metal of Cr, Fe, Co, Ni, Si or Ti, or an alloy containing at least one metal selected from the group consisting of those metals. Non-limiting examples of the conductive ceramics include silicon carbide (SiC), and metal compounds such as metal silicides such as tantalum silicide ($TaSi_2$) and chromium silicide ($CrSi_2$).

As a method for producing the honeycomb structure 1 having the electrode layers 5, first, an electrode layer forming raw material containing ceramic materials is applied onto a side surface of a honeycomb dried body and dried to form a pair of unfired electrode layers on the outer surface of the outer peripheral wall 20 so as to extend in the form of the band in the extending direction of the cells 21a, across the central axis of the honeycomb dried body, thereby providing a honeycomb dried body with unfired electrode layers. Then, the honeycomb dried body with unfired electrode layers is fired to produce a honeycomb fired body having a pair of electrode layers 5. The honeycomb structure 1 having the electrode layers 5 is thus obtained. It should be noted that the pair of electrode layers 5 are not essential components, and the honeycomb structure 1 may not include the pair of electrode layers 5.

Figure 2:
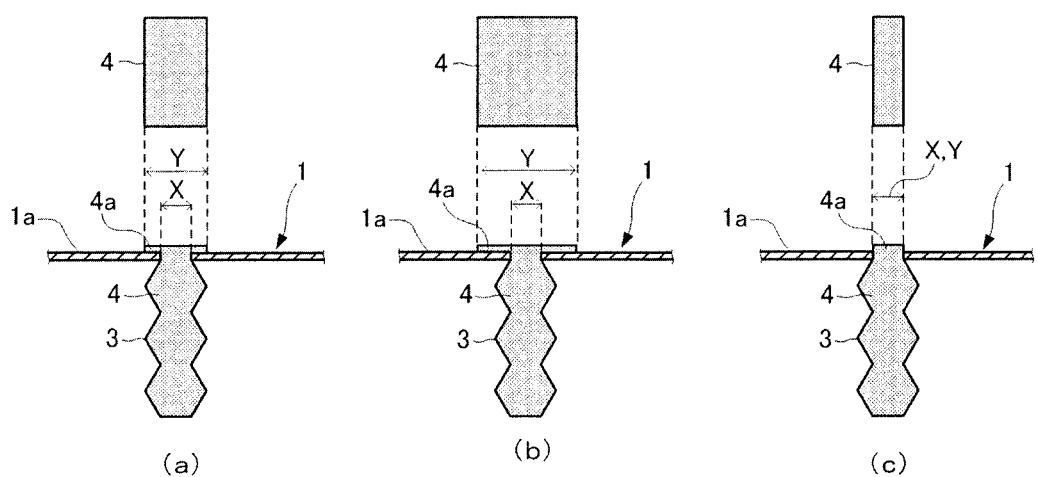
FIG. 2 is an explanatory view showing details of the filling material in FIG. 1.

Next, FIG. 2 is an explanatory view showing details of the filling material 4 in FIG. 1. The lower side of each of (a) to (c) of FIG. 2 shows a cross section of the filling material 4 on a surface perpendicular to the extending direction of the cells 21a. The upper side of each of (a) to (c) of FIG. 2 shows an outer surface of the filling material 4 when the filling material 4 is viewed from the outside in the radial direction of the honeycomb structure 1.

As shown in (a) to (c) of FIG. 2, when the filling material 4 is viewed from the outside in the radial direction of the honeycomb structure 1, a width Y of the filling material 4 may be different for each slit 3. FIG. 2(b) shows a state where the width Y of the filling material 4 is larger than the width Y in FIG. 2(a). FIG. 2(c) shows a state where the width Y of the filling material 4 is smaller than the width Y in FIG. 2(a).

The (a) and (b) of FIG. 2 each shows a state where the width Y of the filling material 4 is larger than the width X of the slit 3 on an outer peripheral surface 1a of the honeycomb structure 1. On the other hand, the (c) of FIG. 2 shows a state where the width Y of the filling material 4 is the same as the width X of the slit 3 on the outer peripheral surface 1a of the honeycomb structure 1.

As described above, the outer peripheral surface 1a of the honeycomb structure 1 is understandable as the outer peripheral wall 20 of the honeycomb structure portion 2 or the outer peripheral surfaces of the electrode layers 5. The widths X and Y of each slit 3 and the filling material 4 is understandable as the dimensions of each slit 3 and the filling material 4 in the circumferential direction of the honeycomb structure 1 (honeycomb structure portion 2). A difference between the widths X and Y of each slit 3 and the filling material 4 may be due to the fact that the filling material 4 slightly protrudes radially outward from the outer peripheral surface 1a of the honeycomb structure 1. The portion of the filling material 4 that protrudes from the outer peripheral surface 1a of the honeycomb structure 1 may be called a protruded portion 4a. The protruded portion 4 a may be caused by a mask applied to the outer peripheral surface 1a of the honeycomb structure 1 when filling the slits 3 with the filling material 4. That is, the thickness of the protruded portion 4a may correspond to the thickness of the mask.

A variation in the width Y of the filling material 4 for each slit 3 causes a variation in stress relaxation performance of the honeycomb structure 1, which may cause a risk of cracking in the honeycomb structure 1 when the honeycomb structure 1 is heated. Therefore, it is considered that a decreased variation in the width Y of the filling material 4 can reduce the risk of cracking in the honeycomb structure 1 when it is heated.

In the honeycomb structure 1 according the present embodiment, when the difference between the width Y of the filling material 4 and the width X of each slit 3 (a width difference for each slit) represented by the following equation (1) is determined for each slit 3, a difference between the maximum value A of the difference and the minimum value B of the difference represented by the following equation (2) is 0.4 mm or less. As will be described below in the section of Examples, the value of the following equation (2) of 0.4 mm or less can reduce the risk of cracking in the honeycomb structure 1 when it is heated. More preferably, the difference between the maximum value A of the difference and the minimum value B of the difference is 0.2 mm or less, and more preferably 0.1 mm or less.

$$(Y-X) \quad (1)$$

$$(A-B) \quad (2)$$

In the equation (1), X represents the width of each slit 3 on the outer peripheral surface 1a of the honeycomb structure 1, and Y represents the width of the filling material 4 when the filling material 4 is viewed from the outside in the radial direction of the honeycomb structure 1.

The following presumption is considered for the effect of reducing the risk of cracking in the honeycomb structure when it is heated, which is obtained by controlling the variation in the difference (difference between the maximum value A and the minimum value B) when the difference between the width Y of the filling material 4 and the width X of each slit 3 represented by the above equation (1) is determined for each slit to the above range. When filling the slits 3 with the filling material 4, the slits 3 are filled with the filling material 4 after applying a mask to the outer peripheral surface 1a of the honeycomb structure 1 in which the slits 3 have been formed. At this time, if the width of the masked slit varies depending on the mask applying method, the width Y of the filling material 4 as viewed from the outside in the radial direction of the honeycomb structure 1 also varies after filling the slits 3 with the filling material 4. The variation in the width Y of the filling material 4 causes the variation in the stress relaxation performance in the circumferential direction of the honeycomb structure 1, so that for example, the cracking may occur when the honeycomb structure 1 is heated at a portion of the honeycomb structure 1 where the stress relaxation performance is lower. On the other hand, it is believed that by suppressing the variation in the difference between the width Y of the filling material 4 and the width X of each slit 3 as described above, the variation in the width Y of the filling material 4 can be suppressed, so that the variation in the stress relaxation performance of the honeycomb structure 1 in the circumferential direction can be suppressed.

The width X of each slit 3 can be determined by measuring a length between both ends of each slit 3 in the extending direction of the cells 21a from the end face side of the honeycomb structure 1 by means of a microscope and taking an average value thereof. The width Y of each filling material 4 can be determined by measuring a length between both ends of the width of the filling material 4 in the extending direction of the cells 21a from the end face side of the honeycomb structure 1 by means of a microscope and taking an average value thereof.

Each of the widths X of the slits 3 may be, but not limited to, 0.2 mm to 1.0 mm. The width X of each slit 3 of 0.2 mm or more can allow the filling material 4 to be smoothly filled in each slit 3. The width X of each slit 3 of 1.0 mm or less can reduce a risk of damaging the partition wall 21 that defines the adjacent cells 21a when the slits 3 are formed. More preferably, each of the widths X of the slits 3 is 0.4 mm to 0.7 mm.

Moreover, the honeycomb structure 1 may have two or more slits 3, and more preferably six or more slits 3, from the viewpoint of a stress relaxation effect. The upper limit of the number of the slits 3 is not particularly limited, but it may be 12 or less.

Figure 3:
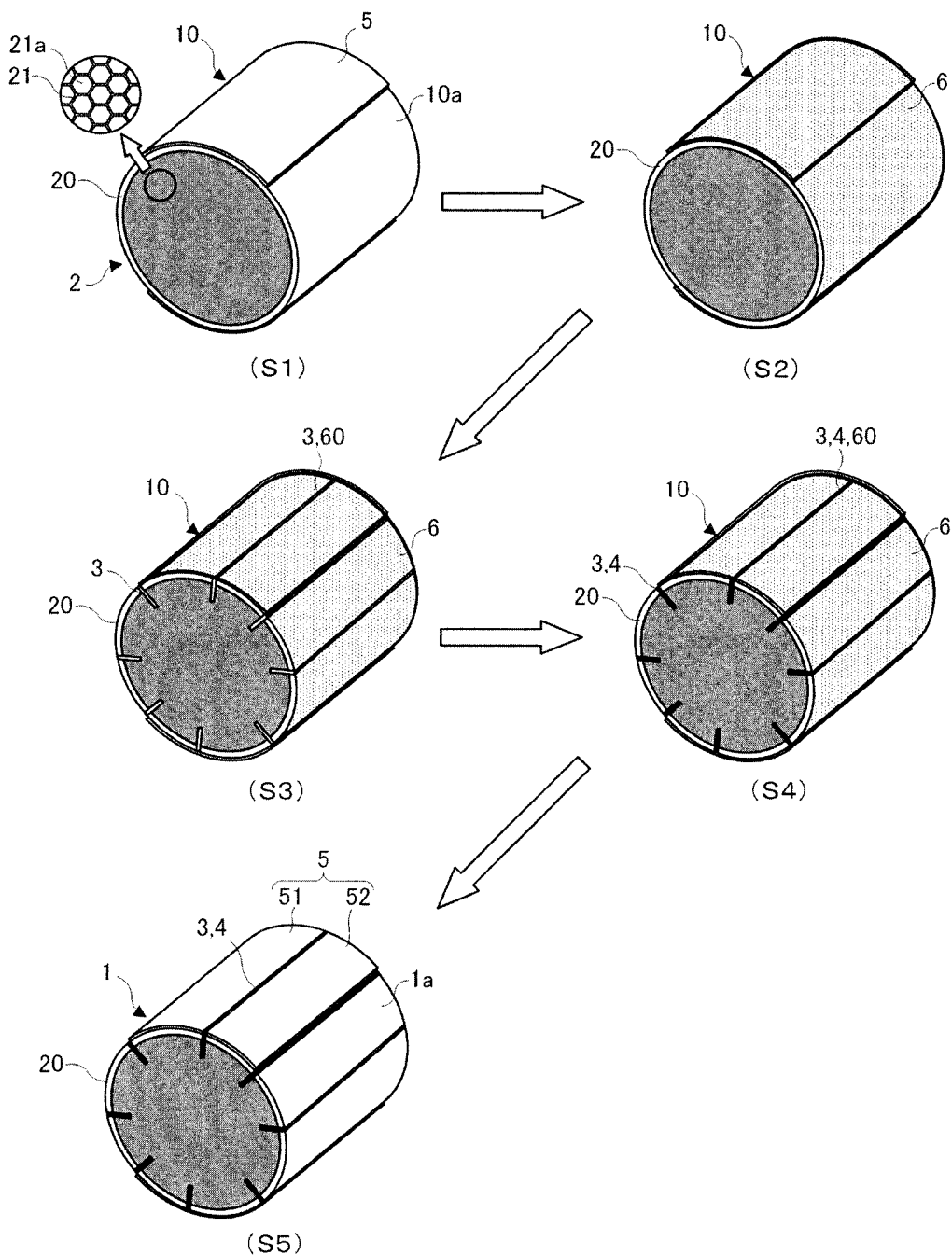
FIG. 3 is an explanatory view showing a method for producing a honeycomb structure according to an embodiment of the present invention.

Next, FIG. 3 is an explanatory view showing a method for producing the honeycomb structure 1 according to an embodiment of the present invention. The honeycomb structure 1 in which the variation in the difference between the width Y of the filling material 4 and the width X of each slit 3 is suppressed as described above can be produced by the production method as shown in FIG. 3, although not limited thereto.

The production method as shown in FIG. 3 includes a preparing step (step S1), a masking step (step S2), a slit forming step (step S3), a filling step (step S4) and a removing step (step S5).

The preparing step (step S1) is a step of preparing a honeycomb structure base body 10 including the honeycomb structure portion 2 including: the outer peripheral wall 20 and the partition wall 21 arranged on the inner side of the outer peripheral wall 20, the partition wall 21 defining the plurality of the cells 21a, each of the cells 21a extending from one end face to the other end face to form the flow path. The honeycomb structure base body 10 may have the same structure as that of the honeycomb structure 1 described above with reference to FIG. 1. The honeycomb structure base body 10 may have the pair of electrode layers 5. In the preparing step, the honeycomb structure base body 10 produced by a manufacturer may be available. That is, the preparing step does not have to involve the production of the honeycomb structure base body 10.

The masking step (step S2) is a step of applying a mask 6 to the outer peripheral surface 10a of the honeycomb structure base body 10. The outer peripheral surface 10a of the honeycomb structure base body 10 may be understood as the outer peripheral wall 20 of the honeycomb structure base body 2 or the outer peripheral surfaces of the electrode layers 5, as with the outer peripheral surface 1a of the honeycomb structure 1 as described above. The mask 6 can be applied by wrapping a masking sheet around the outer peripheral surface 10a of the honeycomb structure base body 10, although not limited thereto. The mask 6 covers the entire outer peripheral surface 10a. Examples of the mask 6 that can be used herein include a general masking tape made of a Japanese paper substrate with a rubber-based adhesive.

In the slit forming step (step S3), after the mask 6 is applied, the honeycomb structure base body 10 is processed from the outside in the radial direction to form the slits 3 extending radially inward from the outer peripheral surface 10a of the honeycomb structure base body 10 and extending in the extending direction of the cells 21a on the outer peripheral surface 10a of the honeycomb structure base body 10. The processing for forming the slits 3 may include relatively inserting a processing tool into the outer peripheral surface 10a of the honeycomb structure base body 10 from the outside in the radial direction, and relatively moving the processing tool in the extending direction of the cells 21a. The inserting and moving of the processing tool can be performed by moving at least one of the honeycomb structure base body 10 and the processing tool relative to the other. The processing tool that can be used herein include a disk-shaped cutting tool having abrasive grains attached to the outer edge.

In this slit forming step, masked slits 60 are formed in the mask 6 in accordance with the formation of the slits 3. The slits 3 and masked slits 60 are formed at substantially the same timing with the same processing tool. Each masked slit 60 has the same width as that of each slit 3. The position of each masked slit 60 is the same position as that of each slit 3.

The filling step (step S4) is a step of, after forming the plurality of slits 3, filling the slits 3 with the filling material 4. The filling of the slits 3 with the filling material 4 is performed through the masked slits 60. Although not limited, after the filling material 4 is fed onto the mask 6, the honeycomb structure base body 10 can be rotated while pressing a tip of a spatula (not shown) against the outer surface of the mask 6 to fill the slits 3 with the filling material 4. Alternatively, after filling the slits 3 with the filling material 4 through the masked slits 60 with a syringe (not shown), the filling material 4 on the mask 6 may be leveled with a spatula (not shown).

The removing step (step S5) is a step of removing the mask 6 after the filling of the filling material 4. The mask 6 may be removed after the filling material 4 has solidified. The honeycomb structure base body 10 from which the mask 6 has been removed can be handled as the honeycomb structure 1. By removing the mask 6, the outer peripheral surface 1a of the honeycomb structure 1 appears.

When the filling material 4 on the outer peripheral surface 1a of the honeycomb structure 1 is observed after the mask 6 is removed, the state would be substantially as shown in FIG. 2(c). That is, it is considered that the width Y of the filling material 4 is the same as the width X of each slit 3 on the outer peripheral surface 1a of the honeycomb structure 1. This is because the slits 3 and the masked slits 60 are formed together in the same step, and each masked slit 60 has the same width as that of each slit 3. The difference between the width Y of the filling material 4 and the width X of each slit 3 can be reduced for all the slits 3. The difference between the width Y of the filling material 4 and the width X of each slit 3 would be substantially zero for all the slits 3. Therefore, it is expected that the value (difference between the maximum value A and the minimum value B) represented by the above equation (2) for each slit 3 is also 0.4 mm or less.

In addition to the production method as described above, a method of removing the mask at the portion corresponding to the slit forming portion, and then forming the slits 3 and filling them with the filling material 4, after performing the masking step (step S2), can also provide the value (difference between the maximum value A and the minimum value B) represented by the equation (2) of 0.4 mm or less. The value (the difference between the maximum value A and the minimum value B) can be 0.4 mm or less.

While the preferred embodiments of the present invention have been described in detail above with reference to the drawings, the present invention is not limited to such embodiments. It is obvious that one of ordinary skill in the art to which the present invention belongs can arrive at various variations or modifications in the scope of the technical idea recited in the claims, and they are also understood to belong to the technical scope of the present invention.

EXAMPLES

Examples are given below.
(1. Production of Green Body and Honeycomb Formed Body)

A ceramic raw material is prepared by mixing silicon carbide (SiC) powder and metal silicon (Si) powder at a mass ratio of 80:20. To the ceramic raw material are then added hydroxypropylmethyl cellulose as a binder and a water absorbent resin as a pore former, and water is added to obtain a forming raw material. The forming raw material was then kneaded by a vacuum kneader to prepare a cylindrical green body. The content of the binder is controlled to be 7 parts by mass when the total of silicon carbide (SiC) powder and metal silicon (Si) powder is 100 parts by mass. The content of the pore former is controlled to be 3 parts by mass when the total of silicon carbide (SiC) powder and metal silicon (Si) powder is 100 parts by mass. The content of water is controlled to 42 parts by mass when the total of silicon carbide (SiC) powder and metal silicon (Si) powder is 100 parts by mass.

The above cylindrical green body was formed using an extruding machine having a grid-shaped die structure to produce a cylindrical honeycomb formed body in which each cell had a hexagonal shape in the cross section perpendicular to the flow path direction of the cells. The honeycomb formed body was then dried by high-frequency dielectric heating, and then dried at 120° C. for 2 hours using a hot air dryer to prepare a honeycomb dried body.
(2. Preparation and Application of Electrode Portion Forming Paste)

Metal silicon (Si) powder, silicon carbide (SiC) powder, methyl cellulose, glycerin, and water were mixed in a rotation and revolution agitator to prepare an electrode portion forming paste. The Si powder and the SiC powder were blended in a volume ratio of Si powder:SiC powder=40:60. Also, when the total of the Si powder and the SiC powder is 100 parts by mass, the amount of methyl cellulose is controlled to be 0.5 parts by mass, the amount of glycerin is controlled to be 10 parts by mass, and the amount of water is controlled to be 38 parts by mass.

The electrode portion forming paste was then applied to the honeycomb dried body by a curved surface printer so as to have an appropriate area and film thickness.

(3. Production of Honeycomb Fired Body)

The honeycomb dried body with the electrode portion forming paste was then fired in an Ar atmosphere at 1400° C. for 3 hours, and then oxidized in an air atmosphere at 1300° C. for 1 hour to obtain a pillar shaped honeycomb fired body (honeycomb structure base body 10). The above steps correspond to the preparing step described in FIG. 3.

(4. Masking and Slit Formation)

The mask 6 (available from NICHIBAN Co., Ltd., in the product name of Masking Tape) was applied to the honeycomb structure base body 10 produced as described above so as to cover the entire outer peripheral surface 10a of the honeycomb structure base body 10 (the outer peripheral wall 20 and the outer peripheral surfaces of the electrode layers 5), and a plurality of slits 3 were then formed at intervals in the circumferential direction of the honeycomb structure base body 10. The formation of the slits 3 was performed by inserting a processing tool from the outside of the mask 6 into the inner side of the outer peripheral wall 20 and moving the processing tool in the extending direction of the cells 21a. The processing tool employed a disc-shaped cutting tool (available from NORITAKE CO., LIMITED, in the product name of Diamond Rim Saw) having abrasive grains adhered to the outer edge.

The filling material prepared as follows was used. First, silicon carbide powder (average particle diameter of 8 μm) and silica powder (colloidal silica) were mixed at a mass ratio of 68:32 as solid content. In this case, the mass of silica is the mass as converted to oxide ($SiO_2$). To this were added carboxymethyl cellulose as a binder, glycerin as a humectant, and water, and mixed to obtain a mixture. The mixture was then kneaded to form the filling material. The binder content was 1.0 parts by mass when the total solid content of the silicon carbide powder and silica powder was 100 parts by mass. The glycerin content was 4 parts by mass when the total solid content of the silicon carbide powder and silica powder was 100 parts by mass. The content of water was 30 parts by mass when the total of the silicon carbide powder and silica powder was 100 parts by mass.

(5. Filling and Removing of Mask)

After the slits 3 were formed, the slits were filled with the filling material 4 through the masked slits 60 of the mask 6. The filling of the filling material 4 was performed by feeding the filling material 4 onto the mask 6 and then rotating the honeycomb structure base body 10 while pressing a tip of a spatula against the outer surface of the mask 6. It was then dried at 120° C. for 1 hour to solidify the filling material 4 filled in the slits 3 and remove the mask 6.

(6. Dimensional Measurement and Strength Test)

A plurality of honeycomb structures 1 (Examples) produced through the above steps were subjected to dimensional measurement and strength test.

In the dimension measurement, the width Y of the filling material 4 and the width X of each slit 3 were measured for each slit 3. Further, the difference between the width Y of the filling material 4 and the width X of each slit 3 represented by the following equation (1) was determined for each slit 3, and the maximum value A of the difference and the minimum value B of the difference represented by the following equation (2) was determined. The width X of each slit 3 was determined by measuring the length between both ends of each slit 3 in the extending direction of the cell 21a from the end face side of the honeycomb structure 1 by means of a microscope (available from Keyence Corporation, in the device name VHX-7000), and taking an average value thereof. Also, the width Y of each filling material 4 was determined by measuring the length between both ends of the width of the filling material 4 in the extending direction of the cells 21a from the end face side of the honeycomb structure 1 by means of the microscope, and taking an average value thereof.

$$(Y-X) \quad (1)$$

$$(A-B) \quad (2)$$

Figure 4:
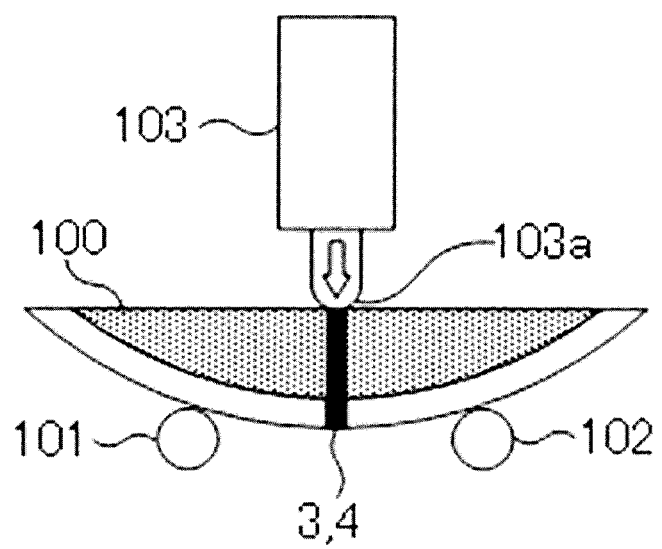
FIG. 4 is an explanatory view showing a strength test.

In the strength test, a three-point bending strength test was conducted as shown in FIG. 4. That is, a plurality of samples 100 were produced from the honeycomb structure 1 by cutting out the peripheral portion of the honeycomb structure 1 in an arc shape so as to include the slits 3 and the filling material 4. The cutting-out of each sample 100 was carried out by cutting the honeycomb structure 1 along a straight line parallel to the radial direction of the honeycomb structure 1. More particularly, the honeycomb structure 1 was cut along the straight line at a position radially inward by one cell 21a from the tip (the partition wall 21 positioned at the radially inward end portion) of each slit 3 (and the filling material 4), and the partition wall 21 defining the above extra cell 21a was then scraped off such that the ends of the slits 3 appeared. At this time, the tip portion of each slit 3 was flattened. Each slit 3 and the filling material 4 were located at the center of the sample 100 in the width direction. Each sample 100 had a strip shape having a thickness of about 3.7 mm in the extending direction of the slits 3, a depth of about 10 mm in the extending direction of the cells 21a, and a width of about 25 mm in the direction orthogonal thereto. These dimensions were measured using a vernier caliper. As a measuring device, a compression tester 5569 from Instron was used. For each sample 100, the curved outer peripheral surface of the sample 100 was supported from below by two fulcrums 101, 102 (distance between the fulcrums: 10 mm) while facing the straight cut surface of the sample 100 facing upward, and a pressing body 103 arranged above the sample 100 was pressed against the central portion of the sample 100 in the width direction. The pressing body 103 is fixed to a load cell. Then, the pressing body 103 was pressed against the sample 100 at a load of 1 kN and a load application rate of 0.5 mm/min, and a strength was calculated from the maximum load measured by the load cell. More particularly, the pressing body 103 had a semicircular tip 103a having a radius of 0.5 mm, and the tip 103a of the pressing body 103 was pressed against the flattened tip of the slit 3. The strength measurement was performed for each slit 3, and the maximum value A and minimum value B, and the variation in strength, which is the difference between the maximum value and the minimum value of the strength, were determined.

For comparison, a honeycomb structure 1 (Comparative Example) was also produced by forming the slits 3, then manually applying the mask 6 to the outer peripheral surface of the honeycomb structure base body 10 so as to exclude the portions of the slits 3, and then filling the slits 3 with the filling material 4. Then, such a comparative example was also subjected to the dimensional measurement and the strength test as described above. The results of the dimensional measurements and the strength tests in Examples and Comparative Examples are shown in Table 1 below.

TABLE 1

| | Number of Slits | Depth of Slit [mm] | Width X of Slit [mm] | Width Y of Filling Material [mm] | A (Maximum of Y − X) [mm] | B (Minimum of Y − X) [mm] | A − B [mm] | Maximum of Strength [MPa] | Minimum of Strength [MPa] | Variation in Strength [MPa] |
|---|---|---|---|---|---|---|---|---|---|---|
| Example 1 | 8 | 3.5 | 0.6 | 0.6 | 0 | 0 | 0 | 2.3 | 2.3 | 0 |
| Example 2 | 8 | 3.5 | 0.6 | 0.8-1.0 | 0.4 | 0.2 | 0.2 | 2.5 | 2.4 | 0.1 |
| Example 3 | 8 | 3.5 | 0.6 | 1.2-1.6 | 1.0 | 0.6 | 0.4 | 2.6 | 2.5 | 0.1 |
| Comparative Example 1 | 8 | 3.5 | 0.6 | 1.0-2.0 | 1.4 | 0.4 | 1.0 | 2.7 | 2.4 | 0.3 |

As shown in Table 1, in Comparative Example, the difference between maximum value A and minimum value B was 1.0 mm, and the variation in strength (difference between the maximum value and the minimum value of the strength) was 0.3 MPa. On the other hand, in each of Examples, the difference between the maximum value A and the minimum value B was 0.4 mm or less, and the variation in strength was 0.1 MPa or less. From this result, it is found that the difference between the maximum value A and the minimum value B of 0.4 mm or less can reduce the risk of cracking in the honeycomb structure 1 when it is heated. Also, it is found that the difference between the maximum value A and the minimum value B can be reduced by forming the slits 3 after applying the mask 6.

DESCRIPTION OF REFERENCE NUMERALS

1: honeycomb structure
1a: outer peripheral surface
10: honeycomb structure base body
2: honeycomb structure portion
20: outer peripheral wall
21: partition wall
21a: cell
3: slit
4: filling material
5: electrode layer
6: mask

The invention claimed is:

1. A honeycomb structure comprising a honeycomb structure portion comprising: an outer peripheral wall; a partition wall arranged on an inner side of the outer peripheral wall, the partition wall defining a plurality of cells each extending from one end face to other end face to form a flow path,
wherein the honeycomb structure further comprises:
a plurality of slits extending radially inward from an outer peripheral surface of the honeycomb structure and extending in an extending direction of the cells; and
a filling material filled in the slits, and
wherein, when a difference between a width Y of the filling material and a width X of each of the slits, represented by the following equation (1), is determined for each of the slits, a difference between a maximum value A of the difference and a minimum value B of the difference, represented by the following equation (2), is 0.4 mm or less:

$$(Y-X) \quad (1)$$

$$(A-B) \quad (2),$$

in which equation (1), X represents the width of each of the slits on the outer peripheral surface of the honeycomb structure, and Y represents the width of the filling material when the filling material is viewed from the outside in the radial direction of the honeycomb structure.

2. The honeycomb structure according to claim 1, wherein the width X of each of the slits is 0.2 mm to 1.0 mm.

3. The honeycomb structure according to claim 1, wherein the honeycomb structure portion has two or more of the slits.

4. The honeycomb structure according to claim 1, wherein an outer peripheral surface of the outer peripheral wall forms at least part of the outer peripheral surface of the honeycomb structure.

5. The honeycomb structure according to claim 1, wherein
the honeycomb structure further comprises a pair of electrode layers provided on the outer surface of the outer peripheral wall so as to extend in a form of a band in the extending direction of the cells along a central axis of the honeycomb structure portion; and
at positions where the pair of electrode layers are provided, outer peripheral surfaces of the pair of electrode layers form the outer peripheral surface of the honeycomb structure.

6. A method for producing a honeycomb structure, comprising:
a masking step of applying a mask to an outer peripheral surface of a honeycomb structure base body, the honeycomb structure base body comprising a honeycomb structure portion comprising: an outer peripheral wall; a partition wall arranged on an inner side of the outer peripheral wall, the partition wall defining a plurality of cells each extending from one end face to other end face to form a flow path;
after the masking step, a slit forming step of processing the honeycomb structure base body from the outside in a radial direction to form a plurality of slits extending radially inward from the outer peripheral surface of the honeycomb structure base body and extending in an extending direction of the cells;
after the slit forming step, a filling step of filling the slits with a filling material; and
after filling the slits with the filling material, a removing step of removing the mask.

* * * * *